United States Patent
Boudreau et al.

(10) Patent No.: US 10,397,980 B2
(45) Date of Patent: Aug. 27, 2019

(54) METHOD AND DEVICE FOR ELECTING A COORDINATION NODE IN A COORDINATED MULTIPOINT SET

(71) Applicant: Telefonaktiebolaget LM Ericsson (publ), Stockholm (SE)

(72) Inventors: Gary Boudreau, Kanata (CA); Ronald Casselman, Metcalfe (CA); Gabriel Wainer, Ottawa (CA); Baha Uddin Kazi, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/576,743

(22) PCT Filed: Sep. 10, 2015

(86) PCT No.: PCT/IB2015/056950
§ 371 (c)(1),
(2) Date: Nov. 24, 2017

(87) PCT Pub. No.: WO2016/189366
PCT Pub. Date: Dec. 1, 2016

(65) Prior Publication Data
US 2019/0007996 A1    Jan. 3, 2019

Related U.S. Application Data

(60) Provisional application No. 62/165,997, filed on May 24, 2015.

(51) Int. Cl.
*H04W 84/20* (2009.01)
*H04L 5/00* (2006.01)
(Continued)

(52) U.S. Cl.
CPC .......... *H04W 84/20* (2013.01); *H04B 7/0626* (2013.01); *H04L 5/0035* (2013.01); *H04W 8/005* (2013.01); *H04W 72/08* (2013.01)

(58) Field of Classification Search
CPC ..... H04L 5/0035; H04L 25/03; H04L 5/0073; H04L 1/0026; H04B 7/024; H04B 7/0632;
(Continued)

(56) References Cited

U.S. PATENT DOCUMENTS 9,385,853 B2 *   7/2016   Zhou ................... H04B 7/024
2010/0103821 A1  4/2010   Palanki et al.
(Continued)

OTHER PUBLICATIONS

International Search Report and Written Opinion for International Patent Application No. PCT/IB2015/056950, dated Mar. 7, 2016, 8 pages.

*Primary Examiner* — Wutchung Chu
(74) *Attorney, Agent, or Firm* — Withrow & Terranova, PLLC

(57) ABSTRACT

A method and apparatus for electing a coordination node in a Coordinated Multipoint (CoMP) set of cooperating nodes for receiving channel information from wireless devices operating in a wireless network. In one aspect, a method is provided for a node which includes determining a channel quality parameter for the node indicative of a channel quality between the node and the plurality of wireless devices, receiving a first message from a first neighbor node in the CoMP set, the first message including a channel quality parameter for another node (e.g. the first neighbor node) in the CoMP set indicative of a channel quality between the other node and the plurality of wireless devices, and send a second message to the first neighbor node in the CoMP set, the second message identifying the coordination
(Continued)

node elected by the node based on the channel quality parameters for the node and the other node.

29 Claims, 10 Drawing Sheets

(51) Int. Cl.
*H04B 7/06* (2006.01)
*H04W 8/00* (2009.01)
*H04W 72/08* (2009.01)

(58) Field of Classification Search
CPC ........ H04B 7/063; H04B 7/0417; H04B 7/06; H04B 7/0626; H04W 48/20; H04W 36/08; H04W 84/20; H04W 8/005; H04W 72/08; H04J 11/0053
See application file for complete search history.

(56) References Cited

U.S. PATENT DOCUMENTS

| | | | |
|---|---|---|---|
| 2013/0021929 A1* | 1/2013 | Kim | H04B 7/024 370/252 |
| 2013/0114658 A1* | 5/2013 | Davydov | H04W 4/70 375/224 |
| 2014/0022924 A1* | 1/2014 | Cili | H04W 24/08 370/252 |
| 2014/0098695 A1 | 4/2014 | Jeong et al. | |
| 2015/0009849 A1* | 1/2015 | Gong | H04L 1/0026 370/252 |
| 2015/0099527 A1* | 4/2015 | Zhuang | H04B 7/024 455/452.1 |
| 2015/0230113 A1* | 8/2015 | Zhang | H04L 43/06 370/252 |
| 2015/0318966 A1* | 11/2015 | Liu | H04W 28/16 370/329 |
| 2016/0353457 A1* | 12/2016 | Park | H04B 7/024 |

* cited by examiner

--PRIOR ART--

--PRIOR ART--

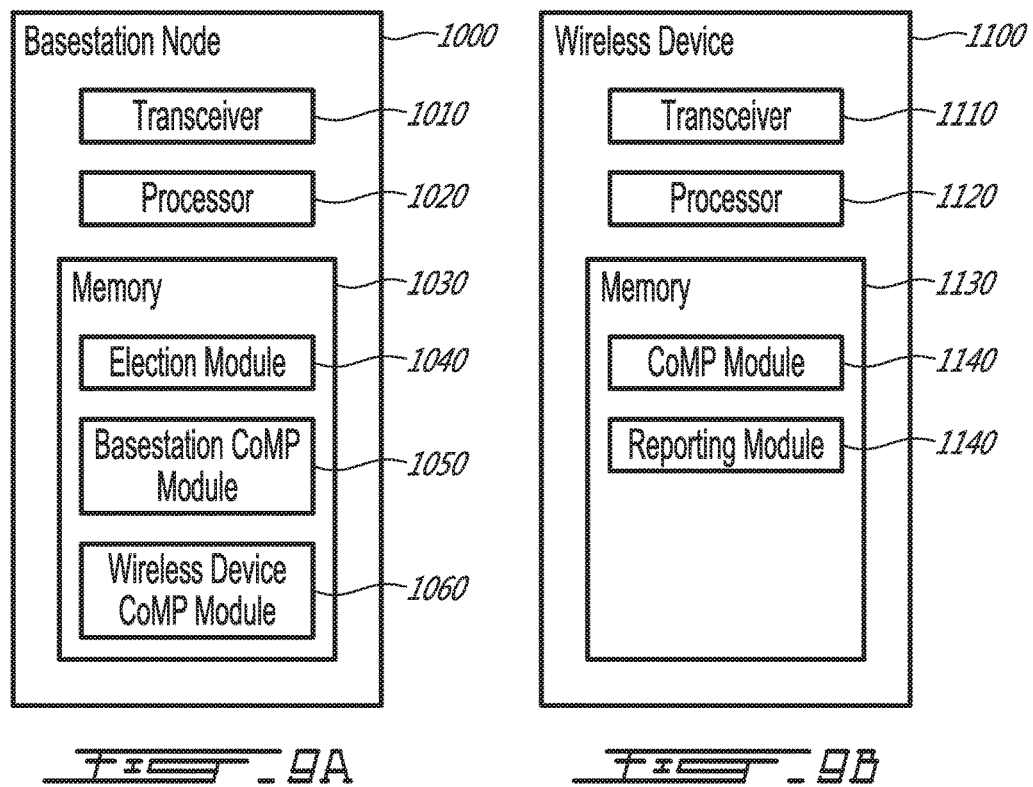
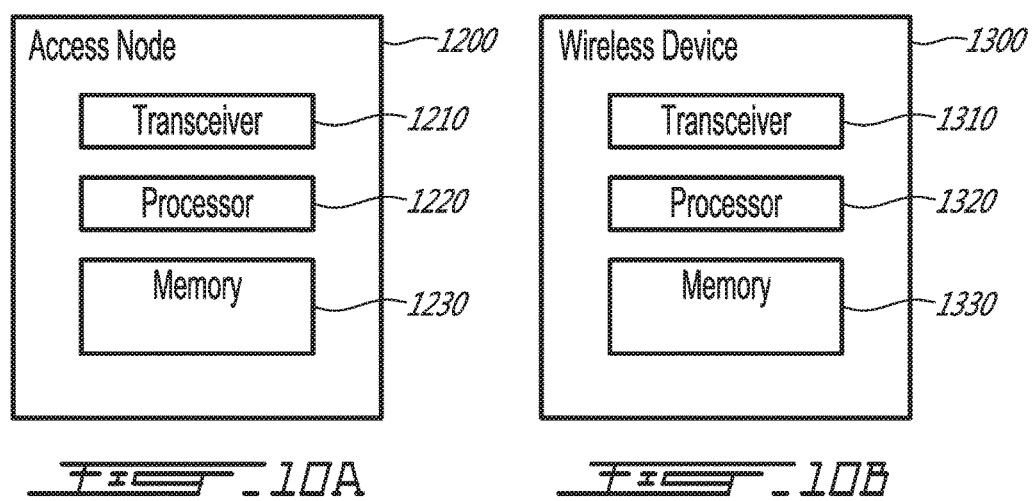

METHOD AND DEVICE FOR ELECTING A COORDINATION NODE IN A COORDINATED MULTIPOINT SET

RELATED APPLICATIONS

This application is a 35 U.S.C. § 371 national phase filing of International Application No. PCT/IB2015/056950, filed Sep. 10, 2015, which claims the benefit of U.S. provisional patent application Ser. No. 62/165,997, filed May 24, 2015, the content of which are hereby incorporated by reference in their entireties.

TECHNICAL FIELD

The present disclosure relates to Coordinated Multi-Point (CoMP) wireless communication systems and in particular to methods and apparatus for CoMP communications using a coordination node.

BACKGROUND

The rapid advancement in cellular networks and mobile devices has led to major improvements in the services provided to cellular networks users. This has resulted in the rate of adoption of mobile devices growing exponentially. Due to the nature of newly provided services such as web access, and to the increased number of users, the demand for higher data rates has also increased exponentially. Providing such high data rates for users has become one of the main challenges for cellular service providers.

At present, the evolution of most 4G wireless networks, such as Long Term Evolution (LTE) and LTE-Advanced (LTE-A), is being driven by this demand for higher capacity and peak throughput. One of the challenges in providing high-speed data in high capacity mobile networks is the prevalence of low data rate cell-edge users which tend to be interference limited, as well as coverage gaps for indoor users.

The scarcity of the radio spectrum is a major reason for the inability to provide higher data rates. As most of the licensed frequency bands are allocated, it is very difficult to allocate sufficient radio resources to the increasing number of users. As such, there is always a need to come up with new approaches to utilize the radio spectrum in more efficient ways.

The demand of higher data transmission rates, reliable connection and uniform quality of service across the cell area in mobile communication systems continues to increase, for instance the growth in mobile/cellular data traffic between quarter one 2013 and quarter one 2014 is reported to be about 65 percent. In order to meet this challenge, a reuse of radio resources in every cell is needed. Nevertheless, these frequency reuse systems experience Inter-Cell Interference (ICI) that limits user throughput, particularly affecting cell edge users.

Coordinated Multi-Point (CoMP) transmission/reception, also known as a Multipoint Cooperative Communication (MCC) technology, is an effective technique to improve the network performance by boosting the throughput for cell-edge users. CoMP can be defined as a method in which participating basestations (BSs) coordinate the handling of interference and scheduling. In CoMP-enabled systems, basestations are grouped into cooperating clusters or sets, each of which contains a subset of the network basestations. The basestations of each cluster exchange information and jointly process signals by forming virtual antenna arrays distributed in space. Furthermore, multiple User Equipment or UEs can also simultaneously receive their signals from one or multiple transmission points in a coordinated or joint-processing manner. Generally, this technique is an effective way of managing ICI. For ICI management, UEs need to measure and report so-called channel-state information (CSI) to the network so that the scheduler can perform adaptive transmissions and appropriate Radio Resource Management (RRM) on that basis. However, CSI reporting generally increases the radio signaling and infrastructure overhead as well as the latency in the network which is well-known to decrease the network throughput. The nature and amount of overhead largely depends on the architecture of the CoMP scheme used.

There are two broad categories of known CoMP architectures, namely centralized and distributed, each typically using a different process to handle CSI feedback. FIG. 1A shows an example of a conventional centralized CoMP architecture 10 in which a Central Unit (CU) 12 uses CSI feedback to perform scheduling decisions for basestations (BSs) 20, 22, 24 which form a set of CoMP cooperating nodes for participating UEs e.g. UEs 30, 32, 34 in cells 14, 16, 18. In this example, each participating UE 30, 32, 34 estimates the CSI associated with each of the basestations 20, 22, 24 in the CoMP set and sends the CSI information estimated to its respective serving basestation 20, 22, 24. The basestations 20, 22, 24 in turn forward the (local) CSI reports received to the CU 12. Finally, the CU calculates the (global) CSI, and based on that, makes scheduling decisions for participating UEs 32, 32, 34 which are then communicated to the basestations 20, 22, 24. Unfortunately, this centralized framework suffers from signaling overhead and infrastructure overhead as well as increased network latency.

FIG. 1B shows an example of a conventional distributed CoMP architecture 50 in which the coordinated basestations 20, 22, 24 exchange the CSI received locally over a fully meshed signaling network of interfaces connecting the basestations 20, 22, 24 (e.g. X2 interfaces). As with the example of FIG. 1A, the participating UEs 30, 32, 34 estimate the CSI related to each particular basestation 20, 22, 24 in the CoMP set and send the information back to their respective serving basestation 20, 22, 24 so that it can be distributed to the other cooperating basestations 20, 22, 24 in the CoMP set. Based on the CSI information received locally and from the other cooperating basestations 20, 22, 24, the basestations 20, 22, 24 schedule their resources independently. As it can be seen, the decentralized architecture of FIG. 1B requires the sharing of local CSI feedback among participating basestations and as such, increases the feedback overhead present on the X2 interface. This in turn also has a negative impact on the latency of the network. Also, the architecture is more sensitive to error patterns on the X2 links between the eNBs, since error patterns could be different for the different X2 links between basestations. This could be a potential cause for further performance degradation compared to a centralized architecture.

Two major challenges of the above architectures are latency and overhead, which are the main barriers to achieving efficient CoMP communications. Generally, latency is inversely related to the throughput of the network. In coordinated schemes such as CoMP, if the latency of the network is greater than the CSI feedback periodicity, the scheduler may receive backdated (i.e. stale) CSI. This in turn can adversely affect throughput. Table 1 illustrates an example of how latency may affect the throughput of a network.

TABLE 1

| | Delay | | |
|---|---|---|---|
| | 5 ms | 1 ms | 200 µs |
| Throughput loss | 20% | 5% | 1% |

According to the above information in Table 1, by reducing the latency by only 1 ms, the throughput of a network can generally be improved by 5%. Low latency to achieve better throughput is not only important to maintaining the quality user experience of services such as social, machine-to-machine and real-time services, but latency reduction is also important to meet the ever increasing capacity expectations for future wireless network architectures currently being developed and for which latency budgets continue to shrink. Therefore, it is desirable to reduce the latency associated with or caused by the need for CSI reporting in order to improve network throughput and efficiency.

SUMMARY

Embodiments of the present disclosure seek to address one or more of the issues mentioned above in relation to conventional CoMP architectures.

The present disclosure provides methods and systems for CoMP communications using a coordination station or node.

According to principles of the present disclosure, in one embodiment, an elected node in a CoMP set of nodes in a wireless network is configured as a coordination station to receive Channel State Information (CSI) feedback from participating UEs in the wireless network. In some implementations, the elected node is configured to receive CSI feedback from participating UEs, determine a schedule of radio resources (e.g. RBs) for the participating UEs based on the CSI feedback received and send the schedule to other nodes in the CoMP set for CoMP operation.

In other implementations, the elected node is further configured to calculate global CSI information. In yet other implementations, the elected node is further configured to determine the set of nodes to include in the CoMP set. In yet other implementations, the elected node is further configured to operate as a Central Coordination Station (CCS).

In one broad aspect of the present disclosure, there is provided a method for a node for electing a coordination node in a Coordinated Multipoint (CoMP) set of cooperating nodes for receiving channel information from a plurality of wireless devices operating in a wireless network. In one example, the method includes determining a channel quality parameter for the node indicative a channel quality between the node and the wireless devices, receiving a channel quality parameter from at least one neighbor node in the CoMP set indicative of a respective channel quality between the at least one neighbor node and the wireless devices and electing the coordination node as either the node or one of the at least one neighbor node based on the channel quality parameters. In some embodiments, the method includes sending a message to the at least one neighbor node that identifies the coordination node elected.

In another example, the method includes determining a channel quality parameter for the node indicative of a channel quality between the node and the plurality of wireless devices and receiving a first message from a first neighbor node in the CoMP set which contains a channel quality parameter for another node (e.g. a neighbor elected node) in the CoMP set indicative of a channel quality between the other node (e.g. the neighbor elected node) and the plurality of wireless devices. The method also includes sending a second message to the first neighbor node in the CoMP set where the second message identifies the coordination node elected by the node based on the channel quality parameters for the node and the other node (e.g. the neighbor elected node). The neighbor elected node is either the first neighbor node itself or another node in the CoMP set.

In some other embodiments, the second message identifies the node elected as the coordination node if the channel quality parameter for the node is greater than the channel quality parameter for the neighbor elected node. In other embodiments, the second message identifies the neighbor elected node as the coordination node if the channel quality parameter for the neighbor elected node is greater than the channel quality parameter for the node.

In yet other embodiments, the neighbor elected node is elected by the first neighbor node as one of the first neighbor node and a second neighbor node in the CoMP set based on a channel quality parameter for each of the first and second neighbor nodes. In yet other embodiments, the neighbor elected node is a first neighbor elected node and the method further includes receiving another first message from a second neighbor node in the CoMP set where the other first message includes a channel quality parameter for a second neighbor elected node, and where the second message identifies the coordination node elected by the node based on the channel quality parameters for the node, the first neighbor elected node and the second neighbor elected node.

In yet other embodiments, the steps of receiving and sending are repeated until the elected coordination node identified in the second message is the same as the first neighbor elected node identified in the first message. In yet other embodiments, each of the cooperating nodes in the CoMP set is configured to serve a subset of the plurality of wireless devices in a respective cell of the wireless network.

In yet other embodiments, during a CoMP session, the elected coordination node in the CoMP set is configured to receive channel information from each of the plurality of wireless devices. In yet other embodiments, the channel information includes Channel State Information (CSI), the channel quality parameter for the node and for the other node is based on CSI received from the plurality of wireless devices prior to the CoMP session and/or during the CoMP session, the elected coordination node in the CoMP set is configured to allocate radio resources to each of the wireless devices for receiving the channel information.

In yet other embodiments, the first message is a CoMP grant message received from the first neighbor node in response to a CoMP request message sent by the node. In yet other embodiments, the second message is a CoMP notification message.

In another broad aspect of the present disclosure, there is provided a node for electing a coordination node in a CoMP set of cooperating nodes for receiving channel information from a plurality of wireless devices operating in a wireless network, where the node includes circuitry containing instructions which, when executed, cause the node to perform any of the steps and/or method embodiments described above.

In yet another broad aspect of the present disclosure there is provided a non-transitory computer readable memory configured to store executable instructions for a node, the executable instructions when executed by a processor cause the node to perform any of the steps and/or method embodiments described above.

In another broad aspect of the present disclosure, there is provided a node for electing a coordination node in a CoMP set of cooperating nodes for receiving channel information from a plurality of wireless devices operating in a wireless network. The node includes an election module for electing the coordination node for the CoMP set. In one example, the election module is for determining a channel quality parameter for the node indicative a channel quality between the node and the wireless devices, receiving a channel quality parameter from at least one neighbor node in the CoMP set indicative of a respective channel quality between the at least one neighbor node and the wireless devices and electing the coordination node as either the node or one of the at least one neighbor node based on the channel quality parameters. In some embodiments, the election module is also for sending a message to the at least one neighbor node that identifies the coordination node elected.

In another example, the election module is for determining a channel quality parameter for the node indicative of a channel quality between the node and the plurality of wireless devices and receiving a first message from a first neighbor node in the CoMP set which contains a channel quality parameter for another node (e.g. a neighbor elected node) in the CoMP set indicative of a channel quality between the other node (e.g. the neighbor elected node) and the plurality of wireless devices. The election module is also for sending a second message to the first neighbor node in the CoMP set where the second message identifies the coordination node elected by the node based on the channel quality parameters for the node and the other node (e.g. the neighbor elected node). The neighbor elected node is either the first neighbor node itself or another node in the CoMP set.

In some embodiments, the node also includes a basestation CoMP module for establishing a CoMP set for a wireless device and a wireless device CoMP module for establishing a CoMP configuration for the wireless device. In other embodiments, the wireless device CoMP module is for sending a CoMP command to the wireless device and/or receiving a CoMP acknowledgement from the wireless device.

Advantageously, in some implementations, the present disclosure reduces latency and/or the signaling load in the wireless network as the CSI feedback does not need to be sent via node-to-node or backhaul channels (e.g. X2, S1 connections). In other implementations, the conventional architecture necessary to handle CSI feedback (e.g. a central node separate from the CoMP set of nodes, dedicated cell-specific radio resources and/or backhaul (e.g. X2/S1) resources necessary to transfer the CSI feedback between nodes in the CoMP set) can be reduced or avoided. In yet other implementations, the present disclosure increases the cell throughput over conventional centralized and distributed CoMP architectures as less radio resources are consumed by the CoMP nodes to obtain the CSI feedback from UEs. In yet other implementations, the CSI feedback signaling error is not increased since participating UEs send their CSI feedback to the CCS only.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings in which like reference designators refer to like elements and wherein:

FIGS. 9A-B are block diagrams of exemplary embodiments of a basestation node and a wireless device such as those of FIGS. 2-8, configured for CoMP operation in accordance with the principles of the present disclosure; and FIGS. 10A-B are block diagrams of other exemplary embodiments for the basestation node and wireless device of FIGS. 9A-B configured in accordance with principles of the present disclosure.

DETAILED DESCRIPTION

Figure 1A:
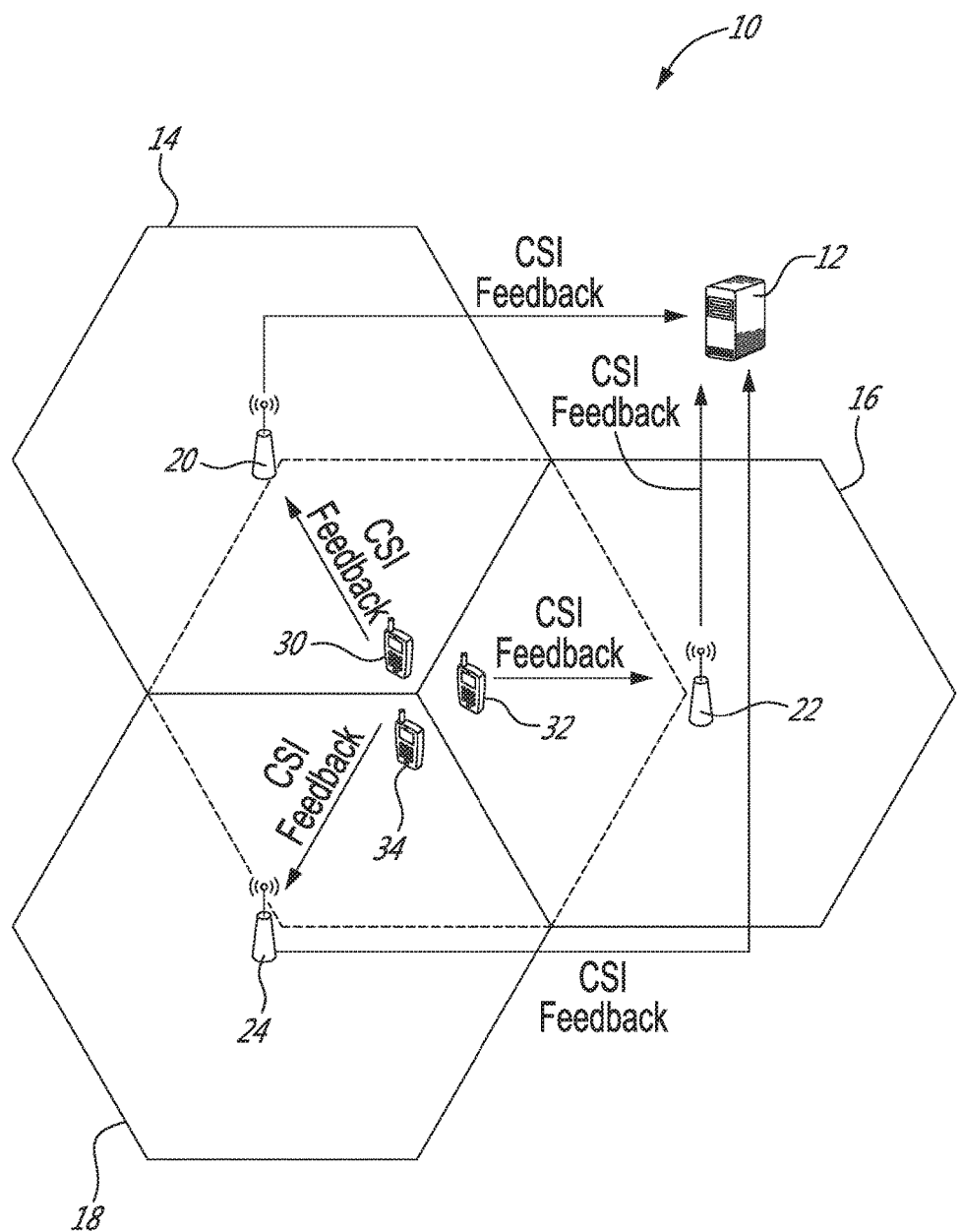
FIG. 1A-B illustrate examples of conventional centralized and distributed Coordinated Multi-Point (CoMP) architectures, each using a different process for handling Channel State Information (CSI) feedback.
Figure 1B:
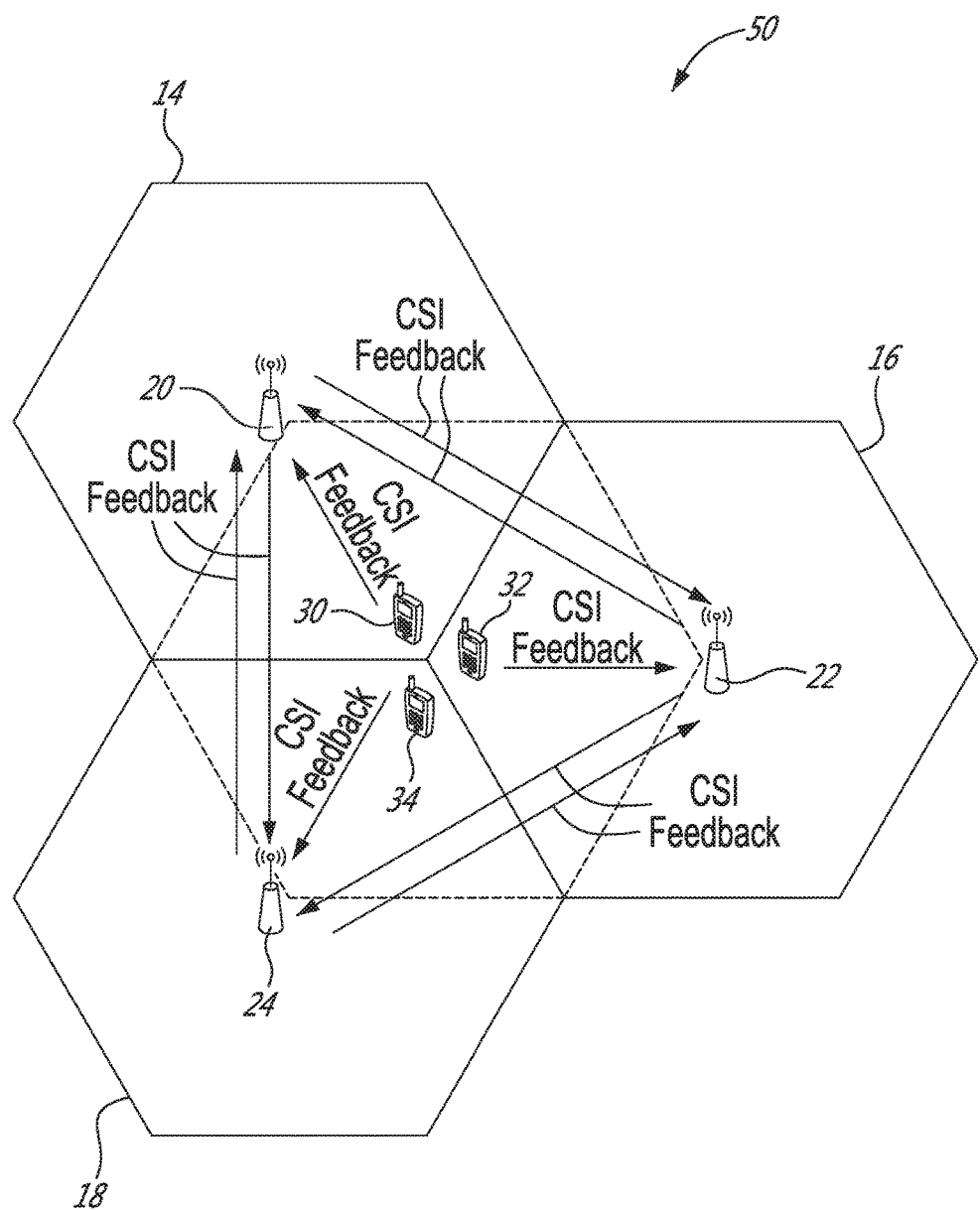

The present disclosure provides methods and systems for CoMP communications using a coordination station or node and includes embodiments which can be implemented in a network node and a UE. The network node herein can be the serving node of the UE or any network node with which the UE can establish or maintain a communication link and/or receive information (e.g. via broadcast channel).

Generally, the present disclosure applies to the reporting of channel quality type information between a wireless device (also known as a User Equipment or UE in 3GPP) and one or more nodes in a wireless network configured for CoMP communications. Examples of channel quality information include Channel State Information (CSI) indicators such as the Channel Quality Indicator (CQI), the Precoding Matrix Indicator (PMI) and/or the Rank Indicator or any combination thereof but the principles described herein could also be applied to other types of quality information associated with a channel between a UE and a node in the wireless network.

The node(s) described herein may each be a Node B (NB), evolved Node B (eNB), basestation, wireless access point (AP), base station controller (BSC), radio network controller (RNC), relay, donor node controlling relay, base transceiver station (BTS), transmission point, transmission node, remote RF unit (RRU), remote radio head (RRH), a node in a distributed antenna system (DAS), core network node or a memory management unit (MMU). More generally, the node(s) may be a serving node of the UE but alternatively may be other node(s) in a Radio Access Network (RAN), a Core Network (CN) or in a network outside of a RAN/CN infrastructure (e.g. an Internet Protocol (IP) node in an IP network) with which the UE may establish or maintain a communication link and/or receive information, in some example embodiments, by a broadcast channel or via some other physical or logical communication channel. For clarity, the examples provided below refer to the nodes as basestations.

The UE or wireless device may be any type of device capable of at least communicating through wireless communication. The wireless device may be, for example a wireless terminal (also known as a mobile stations, a mobile phone ("cellular" phone), a desktop, laptop, netbook, and/or tablet computer, a laptop embedded equipment (LEE), laptop mounted equipment (LME), or a portable device such as an e-book reader, watch, digital music and/or video player, camera, game controller and/or device but also may be a computing-like device such as a heart monitoring implant, biochip transponder, automobile, sensor, modem, thermostat, and/or other home or car appliance generally referred to as an Internet of Things (IoT) device, a machine type communication (MTC) device (also known as a machine-to-machine (M2M) or device-to-device (D2D) device).

The following description will now be presented in the context of an LTE infrastructure but it is to be understood that it is not limited as such and the concepts presented herein may be applied to other 3GPP networks including for example WCDMA, UTRA FDD, UTRA TDD, and GSM/GERAN/EDGE or $4^{th}$ Generation (4G), $5^{th}$ Generation (5G) or other future generations of a 3GPP communication network infrastructure. More generally, the present disclosure applies to any current or future wireless network infrastructure adapted to or configured for CoMP communications.

CoMP is a framework of employing multiple basestations to serve participating UEs in order to improve both peak user throughput as well as the aggregated network throughput. As the name implies, CoMP allows the optimization of transmission and reception from multiple points which could be in multiple cells or in a single cell (e.g. Remote Radio Heads (RRHs)). In order to establish CoMP for a UE, a scheduler must first establish a set of cooperating points (e.g. basestations or nodes) for the UE. In some implementations, the CoMP cooperating set is selected by a scheduler from a larger set of points (the CoMP measurement set) about which the scheduler receives Channel State Information (CSI) and/or other data indicative of the quality of their respective link/channel to the UE. The CSI feedback from each UE typically includes measurements of CSI Reference Signal (CSI-RS) and/or CSI Interference Measurements (CSI-IM) resources, each of which corresponds to a different transmission hypothesis. Based on the CSI information reported, the scheduler selects points to form the CoMP cooperating set and performs the scheduling and transmissions using those points.

The current methods used for CoMP operation for LTE-A include Coordinated Scheduling (CB), Coordinated Beamforming (CB), Joint processing (JP) as well as Dynamic Point Selection (DPS). In CS, the resource assignment is coordinated among multiple basestations, and transmitted/received from/to a selected basestation. In CB, the coordination among basestations or access points is pre-coded, and their transmissions are beamformed towards the User Equipment (UE) of interest. In uplink JP, the data from the UE is available at multiple basestations, whereas for downlink JP, the same data is transmitted by multiple basestations and processed jointly by the receiving UE. For uplink JP, two of the major challenges it faces are the backhaul latency and backhaul bandwidth required to transmit data from the multiple JP basestations to a single process node (typically a basestation). It should also be noted that the transmission/reception point can be dynamically selected in time and/or frequency. The processing and control for any of these CoMP implementations can be coordinated either centrally or through use of a distributed processing architecture.

Distributed processing architectures for CoMP have the potential advantages of lower latency and reduced backhaul complexity with a possible tradeoff in performance. On the other hand, a centralized approach to CoMP processing has the advantage of complete knowledge of the CoMP signals and context but requires the presence of high capacity backhaul or X2 interconnects (e.g. in LTE networks) between the basestations or eNB's in the CoMP cooperating set. Furthermore, centralized CoMP transmission and reception techniques utilize multiple transmit and receive antennas from different locations, to send/receive data as well as reducing the signal interference to the User Equipment (UE). Distributed CoMP solutions can help mitigate the latency and backhaul penalties inherent in centralized CoMP, but with the possibility of reduced performance in comparison.

Existing implementations of CoMP particularly for JP can require extremely high levels of backhaul bandwidth to exchange all of the available data between basestations within a target latency. For the upload of large data files for example, this would involve transferring the received UL data from one or more CoMP cooperating eNBs to the CoMP serving eNB at high bandwidth over X2 interfaces. The bandwidth required for these interfaces can be on the order of 10's of GHz and can be a significant cost barrier to the implementation of JP on the UL as part of CoMP. Furthermore, the exchange of large bandwidths of data over X2 interfaces between eNB's will also incur a significant latency penalty.

According to principles of the present disclosure, one of the nodes in the CoMP set is configured to receive Channel State Information (CSI) feedback from UEs participating in the CoMP set. In some implementations, the node configured to receive CSI feedback is elected as a coordination station or node amongst the nodes in the CoMP set based on one or more link or channel quality metrics between each of the nodes and participating UEs to be served by the CoMP set (further details are provided below).

CSI Feedback

Figure 2:
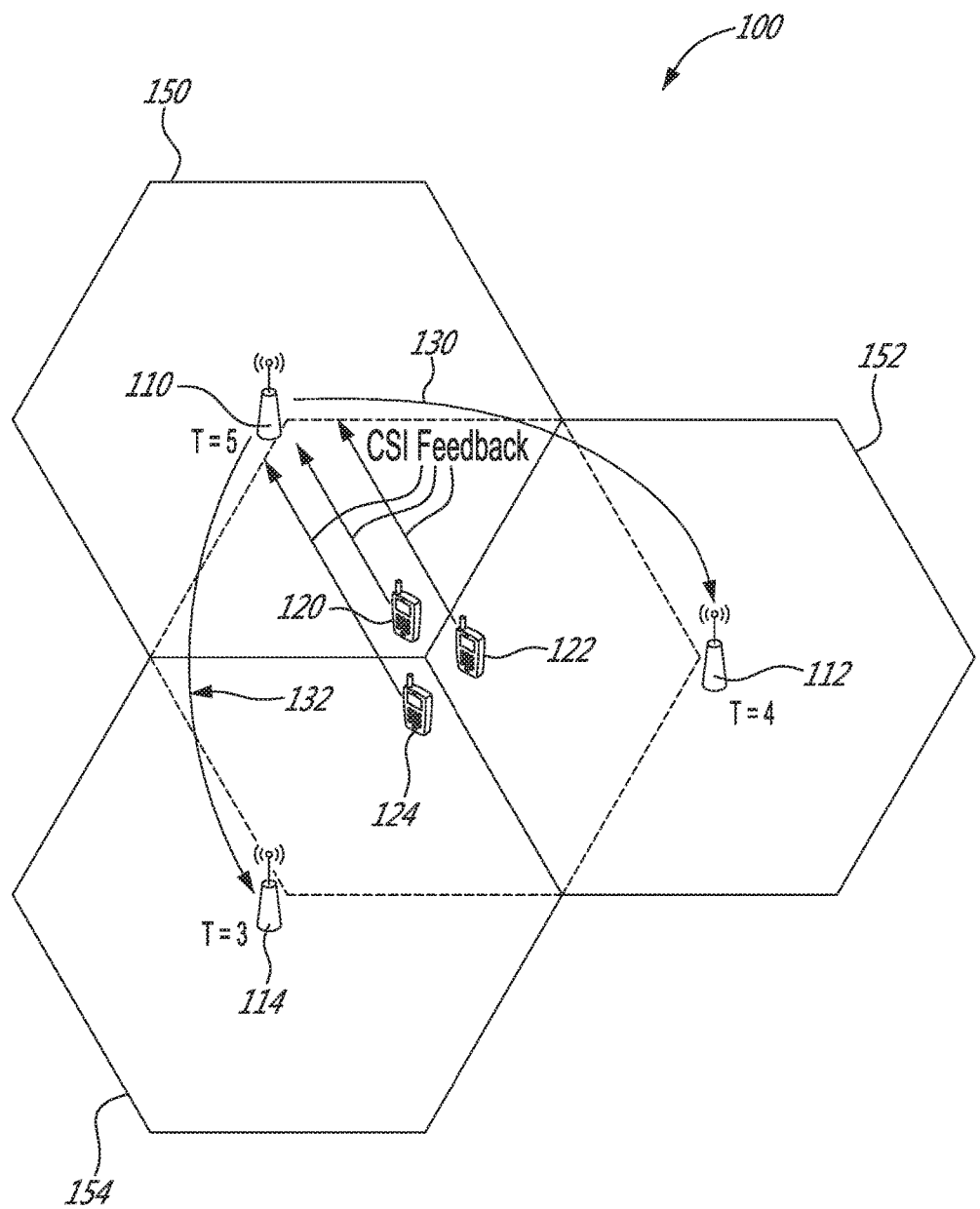
FIG. 2 illustrates an example set of CoMP cooperating nodes in a Long Term Evolution (LTE) Radio Access Network (RAN) with one coordination node elected to receive CSI feedback from participating User Equipment units (UEs), in accordance with principles of the present disclosure described herein.

FIG. 2 shows an example a set of CoMP cooperating nodes (e.g. basestations) 110, 112, 114 in an LTE Radio Access Network (RAN) 100 where node 110 is configured to receive CSI feedback from participating UEs 120, 122, 124 in accordance with one embodiment of the present disclosure. Instead of reporting their CSI feedback to their respective serving basestation 110, 112, 114, UEs 120, 122, 124 are each configured to send their CSI reports to one node or station in the CoMP set elected to receive it (hereinafter also referred to as the "coordination node"). In the example of FIG. 2, basestation 110 is shown as the coordination node. In some implementations, after a CoMP mode or session is established, only the coordination node 110 is configured to receive (and to allocate radio resources for receiving) CSI reports from participating UEs 120, 122, 124. The other nodes in the CoMP set (e.g. unelected basestations 112, 114) do not have to use or allocate radio resources for that purpose. This applies to all participating UEs 120, 122, 124 in the CoMP set, including those for which their respective serving node was not chosen as the elected coordination node. In other implementations, participating UEs 120, 122, 124 broadcast or multicast the CSI feedback (e.g. based on an uplink grant from the elected coordination node) and only the elected coordination node (and, in some implementations, each UE's respective serving basestation 110, 112, 114) is configured to receive the CSI feedback. In yet other implementations, other (unelected) participating basestations 110, 112, 114 in the CoMP set are configured to drop or ignore the CSI feedback received (or are configured not to use or allocate resources to receive the CSI feedback).

In yet other implementations, based on the CSI feedback received, coordination node 110 is also configured to determine a schedule of radio resources (e.g. Radio Blocks or RBs) for participating UEs 120, 122, 124 and to send the schedule via (X2) messages 130, 132 to other nodes 112, 114 in the CoMP set. In other implementations, the coordination node 110 is further configured to determine the schedule based on global CSI information calculated using the (local) CSI reports received from participating UEs 120, 122, 124. In yet other implementations, the basestations 110, 112, 114 are part of a CoMP measurement set (which may also include other nodes (not shown)) for which the coordination node 110 is configured to receive (local) CSI reports from participating UEs 120, 122, 124. In that scenario, the coordination node 110 is further configured to determine the set of nodes to include in the CoMP cooperating set from the CoMP measurement set based on the CSI reports received. In yet other implementations, the coordination node 110 is a (Central) Coordination Station (CCS) in a CoMP set of nodes which is configured to receive CSI feedback from all participating UEs served by the CoMP set.

In the example of FIG. 2 and other examples described below, the CoMP cooperating set of basestations 110, 112, 114 is described as serving a number of participating UEs 120, 122, 124 in different cells 150, 152, 154. From a scheduling perspective, a CoMP session is normally viewed as specific to a particular UE and as such, participating UEs 120, 122, 124 may not necessarily participate in the same CoMP session, even when the same group of basestations 110, 112, 114 is used. In some implementations, a CoMP set of cooperating nodes may itself be viewed as a collection of CoMP sets of nodes, where each particular CoMP set includes the same nodes but serve a different UE in a separate CoMP session or mode. For simplicity, the CoMP set examples described herein refer to a CoMP set serving a number of participating UEs and are also intended to cover implementations where the same group of nodes belongs to different CoMP sets which may or may not have the same total number of nodes and where each CoMP set serves a different UE in the same or separate CoMP sessions.

Coordination Node Election

There are many ways in which a coordination node can be elected. In some implementations, the coordination node election is based on one or more quality metrics or parameters indicative of a general channel quality between each CoMP node and participating UEs. In one implementation, the node election is based on the current or historical throughput measured by each basestation 110, 112, 114 for participating UEs 120, 122, 124. In another implementation, the election is based on CSI reports received at each basestation 110, 112, 114 and the node elected is the one with the highest (averaged) throughput or channel quality estimated based on the CSI reports received from participating UEs 120, 122, 124. In yet another implementation, the node elected is the one with the highest number of participating UEs 120, 122, 124 with a channel quality over a certain threshold. In other implementations, it is possible to use different channel quality metrics. Examples include a Signal-to-Noise Ratio (SNR), a Received Signal Strength Indication (RSSI), a Reference Signal Received Power (RSRP), a Reference Signal Received Quality (RSRQ), a Signal-to-Interference-plus-Noise Ratio (SINR), Signal-to-Leakage Noise Ratio (SLNR) or a combination of any of these metrics or other quality metric that can be calculated at each basestation 110, 112, 114, for example, based on CSI reports obtained from participating UEs 120, 122, 124.

It is important to note that in some implementations, the elected coordination node may be the serving node of some but not necessarily all participating UEs 120, 122, 124. Depending on the channel quality metric used (e.g. average throughput for participating UEs), it is possible that for some participating UEs (e.g. with a serving node selected based on signal strength at that UE), the elected coordination node is different from the serving node. Also, it will be understood that as described herein, the coordination node is elected to receive CSI feedback and optionally perform the scheduling. The actual data transmissions are independent from those functions i.e. they may be done using a different node or a combination of different nodes in the CoMP set based on the chosen scheduling.

Figure 3:
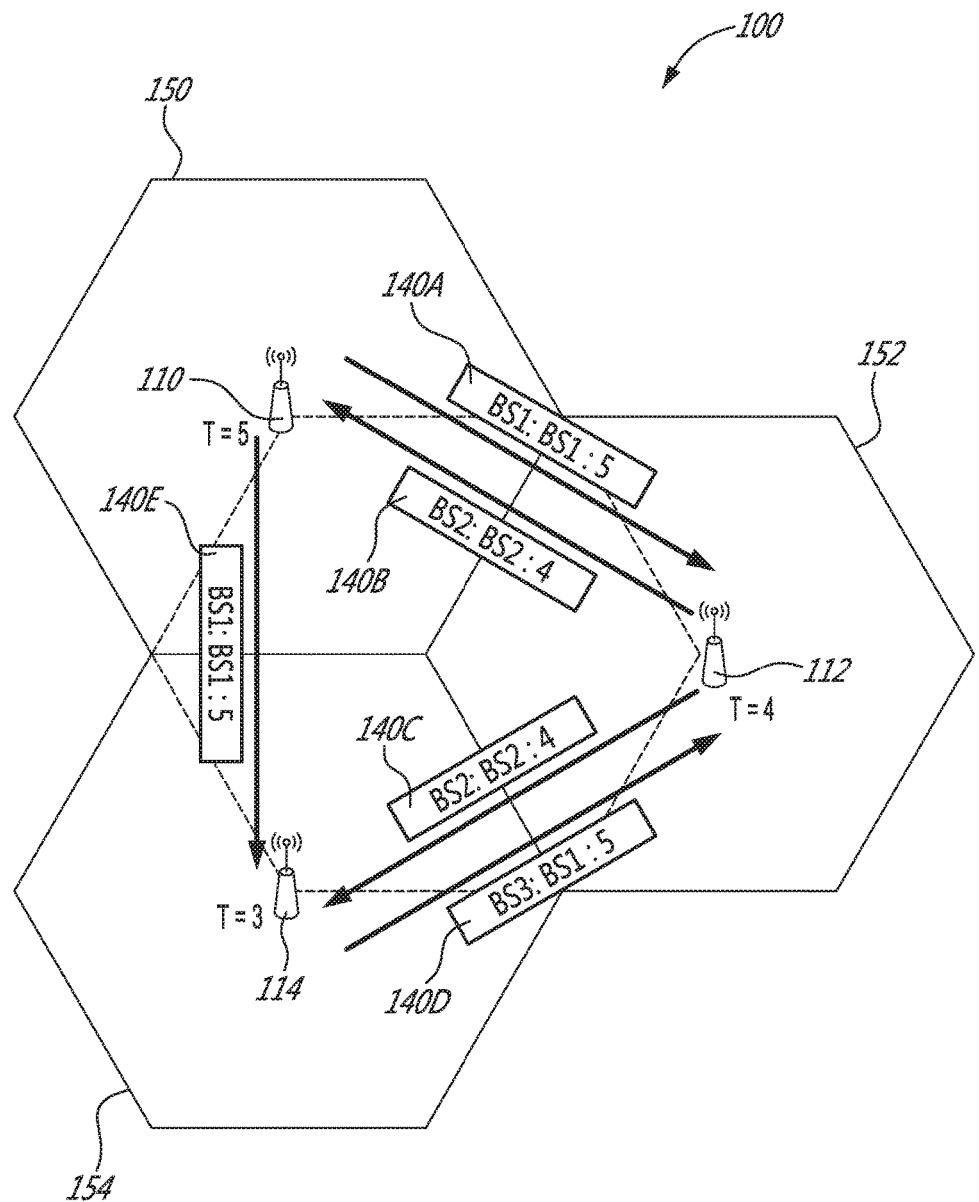
FIG. 3 is a signaling diagram showing an example method for electing a coordination node in the CoMP set of nodes of FIG. 2, in accordance with principles of the present disclosure described herein.

FIG. 3 is a signaling diagram which shows an example method where, in the LTE RAN 100 of FIG. 2, basestations 110, 112, 114 exchange their measured or observed throughput via declaration messages 140A-E over node-to-node interfaces (e.g. X2 or S1 interfaces) so that a determination can be made as to which basestation has the highest throughput. In the example of FIG. 3, basestation 110 is elected as the coordination node (or CCS) to receive CSI feedback because its throughput (T=5) is greater than that of basestation 112 (T=4) and basestation 114 (T=3). Note that in this example, the throughput values T are not absolute but rather indicative of a relative throughput.

In some implementations, the declaration messages are configured for transmission over a node-to-node interface such as an X2 and/or S1 interface. The messages may be dedicated messages (e.g. used specifically for the node election) or may also be used for other purposes and carry other/additional information between the basestations 110, 112, 114. In other implementations, the declaration message sent by a particular basestation 110, 112, 114 contains an identification of the elected node and/or its associated throughput. In yet other implementations, the declaration message also includes an identifier of the basestation 110, 112, 114 sending the declaration message. In the example of FIG. 3, messages 140A-E each includes an identifier indicating the basestation sending the message, an identifier of the node elected by the basestation as well as the elected node throughput. Other possibilities for the declaration messages are possible.

According to principles of the present disclosure, to elect a node, each basestation 110, 110, 114 first determines which of its own throughput and the throughput indicated in previously received messages 140A-E (if any) is the highest. At each basestation 110, 112, 114, the node elected may change depending on the order in which messages 140A-E are sent and received. In FIG. 3 for example, because messages 140B, 140C were sent before messages 140A, 140D and 140D, messages 140B, 140C include the basestation 112's ID, BS2, and throughput (T=4) indicating that basestation 112 elected itself since it was the first in the CoMP set to send its declaration messages. In contrast, at basestation 114, messages 140E and 140C were received before message 140D was sent and as a result, message 140D includes the basestation 110's ID, BS1, and associated throughput (T=5) indicating that basestation 114 has elected basestation 110 based on a comparison of its own throughput (T=3) and that of basestations 110, 112 indicated in messages 140E, 140C. Similarly, at basestation 110, message 140A sent after message 140B was received includes the basestation 110's ID, BS1, and associated throughput (T=5) indicating that basestation 110 has also elected itself based on a comparison of its own throughput (T=5) and that of basestation 112 (T=4) indicated in message 140B. In some embodiments, the basestation election is iterative i.e. basestations 110, 112, 114 exchange messages 140A-E indicating a current election until the election converges and the same basestation (e.g. basestation 110) is elected as the coordination node by all basestations 110, 112, 114 in the CoMP set.

Figure 4:
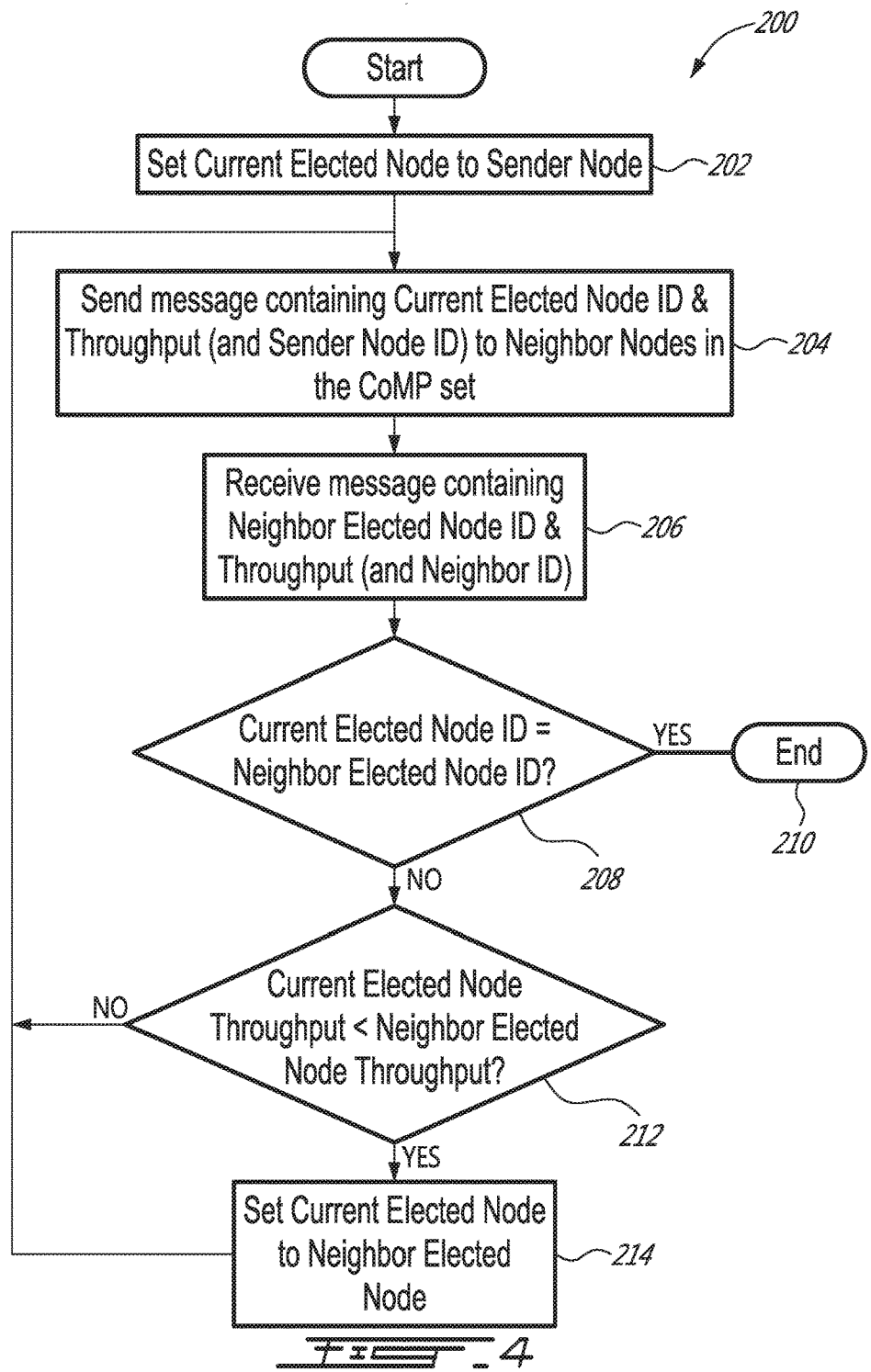
FIG. 4 illustrates an example method for a node in the CoMP set of FIG. 2 for electing a coordination node in accordance with principles of the present disclosure.

FIG. 4 illustrates an example method 200 for a basestation node such as basestation 110 of FIG. 3, for electing a coordination node in accordance with principles of the present disclosure. The election process shown is performed at each of the basestations in the CoMP set. The method begins with the basestation electing or declaring itself as the current elected node by initially setting a (stored) current elected node identifier or ID at step 202 to be that basestation's own ID and sending a message at step 204 (e.g. a declaration message) to neighboring basestations in the CoMP set containing particulars of the current elected node, which, at this stage, is the basestation itself (the "sender basestation"). The particulars include the current elected node ID (set to the basestation ID) together with the throughput associated with the current elected node (in this case the basestation's throughput). The declaration message may also include the ID of the node transmitting the message (in this case the basestation's ID).

At step 206, the basestation receives one or more declaration messages from neighbor nodes containing particulars of a node elected and associated throughput. For each such message received, if the current elected node ID is the same as the neighbor elected node ID, the method ends at step 210. Otherwise, the method proceeds to step 212 where the basestation compares the throughput of the current elected node with that of the neighbor elected node. If the current elected node throughput is higher than that of the neighbor elected node throughput, the node elected by the basestation (e.g. the current elected node) remains the same and the method returns to repeat the election procedure from step 204. If, on the other hand, the neighbor elected node throughput is higher than that of the node currently elected by the basestation, the basestation sets the current elected node at step 214 to be the node identified in the message received from the neighbor node (the neighbor elected node) and the method returns to repeat the election procedure from step 204 where the basestation sends another declaration message to notify its neighbors that its election has changed (e.g. with the current elected node set to the neighbor elected node ID and including its associated throughput). In some embodiments, the basestation election is iterative i.e. each basestation follows the election process of FIG. 4 and exchanges declaration messages with neighbor basestations until the election converges and the same basestation is elected as the coordination node by all basestations in the CoMP set.

In some implementations, even if the elected node does not change when a neighbor elected node changed or when throughput values change, the basestation may continue to notify its neighbors at step 204 that its election has not changed (e.g. by sending more declaration messages containing the current elected node set to the basestation ID). Alternatively, the basestation may skip that step unless a change prompted by a neighbor message received at step 206 or a change in a throughput value occurs. In this scenario, if, after performing steps 206-214, a change in the current elected node occurs, the basestation is configured to send another message to neighbor basestations at step 204 to declare the new (updated) elected node.

In some other implementations, the basestation repeats steps 204-214 for each subsequent declaration message received until no further declaration message is received or until the all of the basestations have elected the same basestation. In yet other implementations, the basestation performs the method shown in FIG. 4 once using one or more declaration message(s) to neighbor nodes to identify the elected node. In one example, the basestation performs a first election by sending a first declaration message to initially declare itself the current elected node (step 204). Based on a comparison of its own throughput with the throughput of neighbor elected node(s) as reported in declaration message(s) received (step 206), the basestation then performs a second election to elect the node with the highest throughput. In another example, the second election is final and the basestation sends a second (final) declaration message to neighbor nodes to notify and confirm the final election (e.g. step 204). In yet another implementation, the basestation sends declaration messages periodically to neighbors to either confirm the current elected node or identifying a new node elected. In yet another implementation, the basestation only sends a new declaration message when a node different from the current elected node is identified (e.g. with a higher throughput). Other implementations are possible.

CoMP with Coordination Node Election

Figure 5:
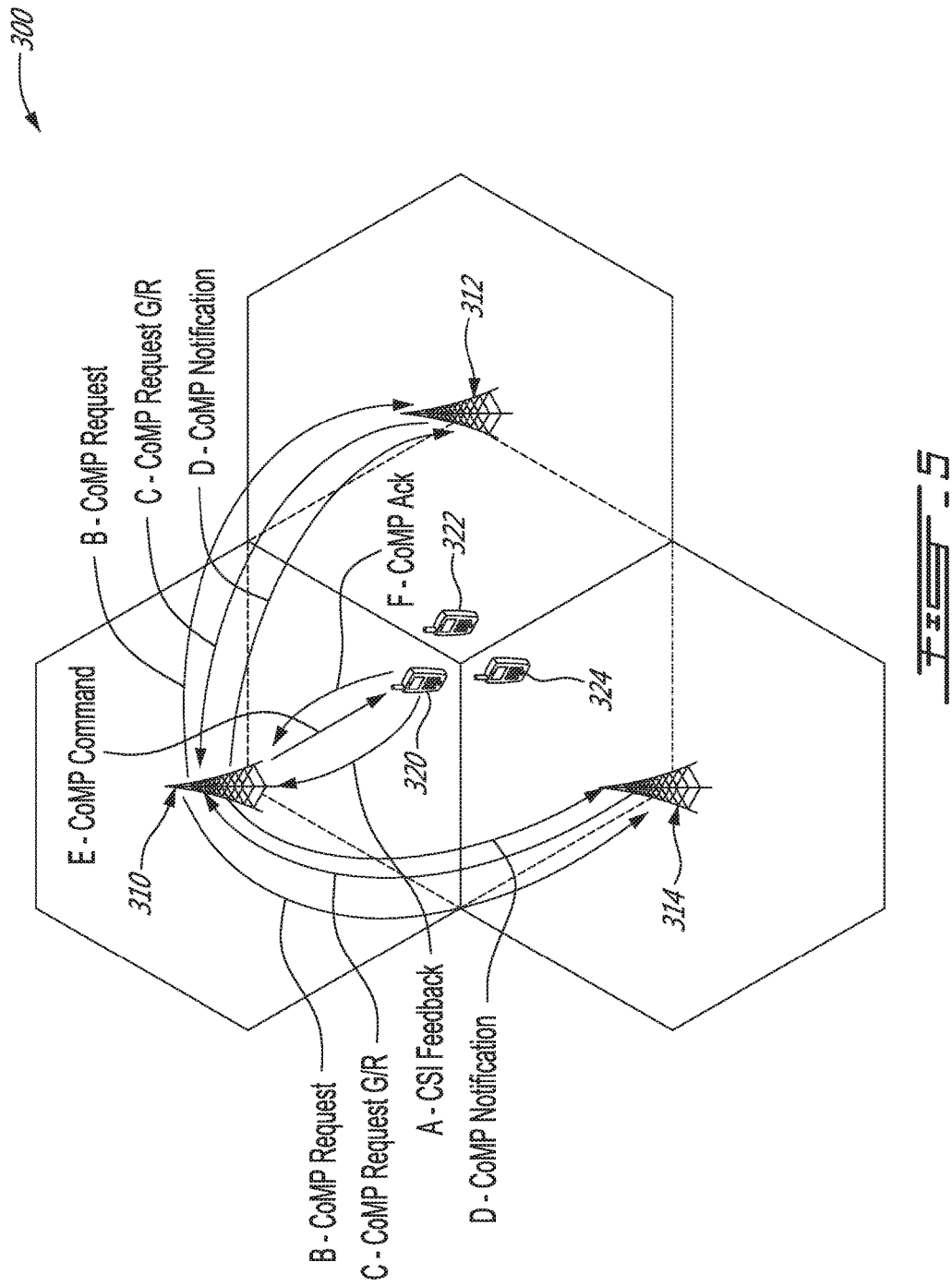
FIG. 5 is a signaling diagram showing another example for electing a coordination node in a CoMP set of basestations, in accordance with principles of the present disclosure described herein.

FIG. 5 is a signaling diagram showing another example of a message exchange to elect a coordination node in a CoMP set of basestations 310, 312, 314 serving UEs 320, 322, 324 where certain CoMP messages exchanged to establish a CoMP session are also used to perform the node election. In this example, UEs 320, 322, 324 are each configured to send their CSI feedback to their respective serving basestation 310, 312, 314. In the case of UE 320 for example, the CSI feedback (message A) is sent to serving basestation 310 and based on the feedback reported, basestation 310 initially determines whether a CoMP session should be established. As is well known, there are many ways in which basestation can determine whether a CoMP session should be established. In the example of FIG. 5, basestation 310 checks the channel or signal quality associated with the UE 320 and compares it to a predefined CoMP threshold. Cell edge UEs such as UE 320 generally will be instructed to enter a CoMP mode when the difference of the received signal power from neighboring basestations is less than a CoMP threshold (a typical value is 3 dB). In some implementations, the signal strength can be calculated based on RSSI, RSRP, RSRQ or SINR measurements or a combination of any of these metrics. Other implementations are possible as well.

If the channel/signal quality is within the CoMP threshold or range (e.g. the basestation 310 signal quality at the UE 320 is such that no handover to another basestation is required but the difference in signal quality between signals received from basestation 310 and neighboring basestations 312, 314 is within the CoMP threshold), basestation 310 will send a CoMP request (message B) to neighboring basestations 312, 314 to form a CoMP set for the UE 310 and establish a CoMP session. The CoMP request (message B)

includes throughput measurements associated with the UE 320 for basestation 310 as well as for each of the neighbor basestations 312, 314. Upon reception of the CoMP request, basestations 312, 314 compare the throughput information received from basestation 310 and associated with UE 320 with throughput information associated with their own participating UEs 322, 324. Based on the availability of resources, each of basestations 312, 314 is configured to respond to the CoMP request with a grant or reject message (message C) that identifies their respective elected coordination node based on the throughput information received from basestation 310 and the throughput information obtained locally in relation to their respective participating UEs 322, 324.

After receiving (grant or reject) responses from the other basestations 312, 314 (messages C) and their respective elected node and associated throughput, basestation 310 determines the (final) elected coordination node for CSI feedback and a schedule of CoMP resources (i.e. RBs) for the CoMP set. Basestation 310 informs the other basestations 312, 314 through a CoMP notification message (message D) that also includes the basestation 310's elected node (which, in this example, is basestation 310). Finally, for downlink CoMP, basestation 310 sends a CoMP command (message E) to instruct the UE 320 to switch to a CoMP mode and optionally, the UE 320 may respond with a CoMP acknowledgement message (message F). The UE 320 then switches its configuration or enters into a CoMP mode to receive/process downlink CoMP data. For uplink CoMP, the CoMP command and acknowledgements may be optional.

After the establishment of a CoMP session, the UE 320 and other participating UEs (e.g. UEs 322, 324) which switched their configuration to a CoMP mode as a result of a CoMP command (from the same or a different serving basestation, e.g. basestation 312, 314) can begin to send CSI feedback only to the elected node 310 based on the example methods discussed above.

Figure 6:
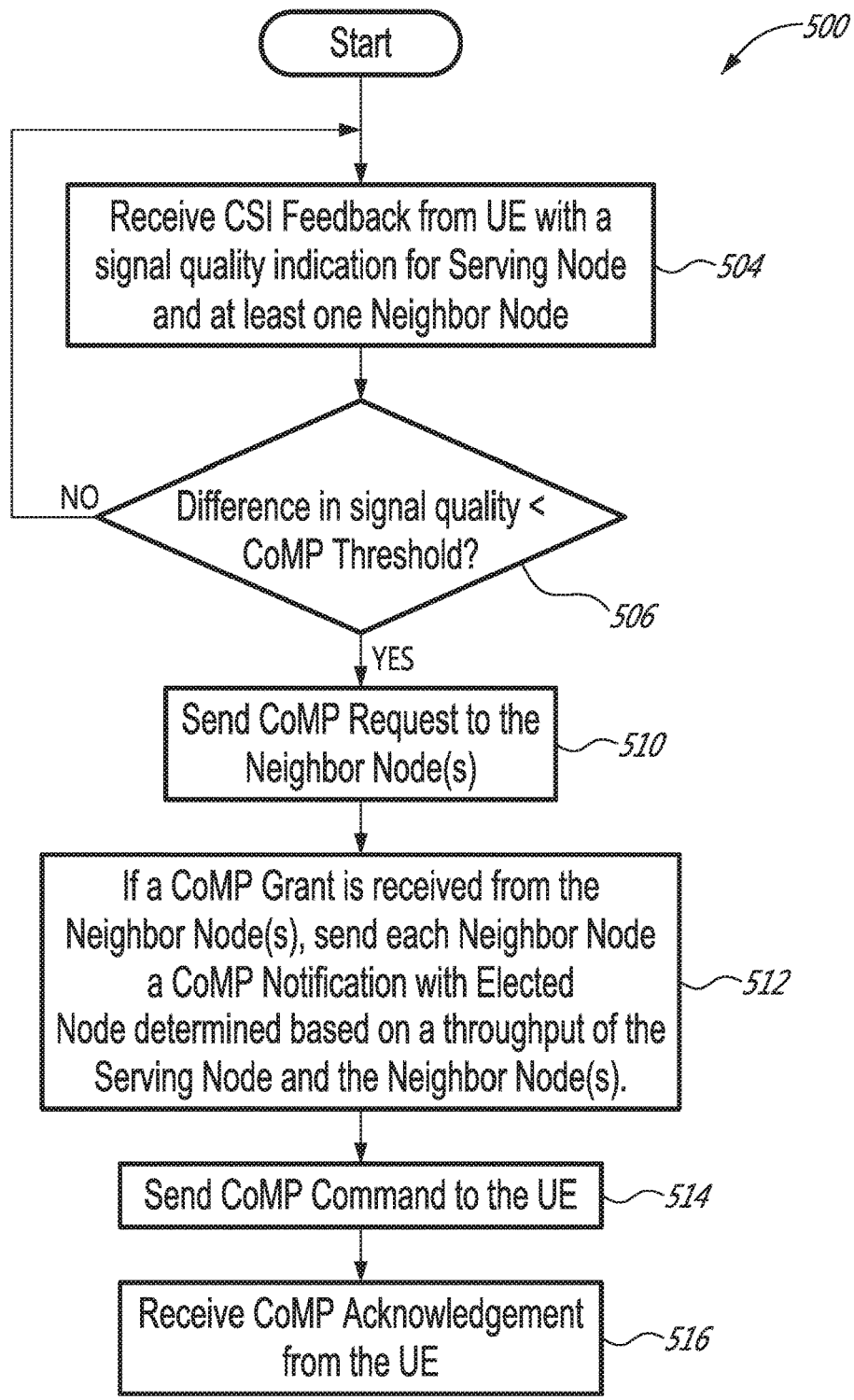
FIG. 6 illustrates an example method for a serving node in the CoMP set of FIG. 5 for electing a coordination node, in accordance with principles of the present disclosure.

FIG. 6 illustrates an example method 500 for a serving node such as basestation 310 of FIG. 5, for electing a coordination node in a CoMP set of nodes for receiving CSI feedback in accordance with principles of the present disclosure. The method begins at step 504 with the serving node initially receiving CSI feedback from a UE which includes a signal quality indication (e.g. signal strength) for the serving node but also for at least one neighbor node. At step 506, if a difference in signal quality (e.g. signal strength) at the UE between signals from the serving node and the neighbor node(s) is greater than a CoMP threshold, the method returns to repeat steps 504 and 506 where the serving node continues to receive and evaluate CSI reports against the CoMP threshold to determine if a CoMP session should be established for the UE.

At step 506, if the difference in signal quality at the UE is less than a CoMP threshold (e.g. the serving node signal quality at the UE is such that no handover to another node is required but the difference in signal quality between signals received from serving node and at least one neighbor node is within the CoMP threshold), the serving node sends a CoMP request message at step 510 to the neighbor node(s). In some implementations, the CoMP request includes throughput measurements associated with the UE for both the serving node as well as for each of the neighbor nodes(s) to which the CoMP request is sent. Upon reception of the CoMP request, the neighbor node(s) compare the throughput information received from the serving node with throughput information associated with participating UEs they serve. Based on the availability of resources, each of neighbor node(s) is configured to respond to the CoMP request with a grant or reject message that identifies a respective coordination node (neighbor elected node) and its associated throughput. The neighbor elected node is elected based on throughput information received from the serving node via the CoMP request and the throughput information obtained locally in relation to their respective participating UEs.

At step 512, if a CoMP grant message is received from at least one neighbor node to which a CoMP request was sent, the serving node sends a CoMP notification message to that (those) neighbor node(s) that identifies the (final) coordination node elected by the serving node for receiving CSI feedback. As mentioned above, there are many ways in which the serving node may elect a (final) coordination node. In some implementations, the serving node compares the throughput information of the respective neighbor elected nodes with its own and elects the node with the highest throughput as the (final) coordination node.

At step 514, the serving node sends a CoMP command to the UE (for downlink CoMP) which in turn may optionally respond with a CoMP acknowledgement message at step 516. The UE then switches its configuration or enters into a CoMP mode to receive/process CoMP data (not shown). For uplink CoMP, the CoMP command and acknowledgement (steps 514, 516) may be optional. After the establishment of a CoMP session, the UE and other participating UEs which switched their configuration to a CoMP mode as a result of a CoMP command (from the same or a different serving basestation) can begin to send their CSI feedback only to the elected node based on the example methods discussed above.

Figure 7:
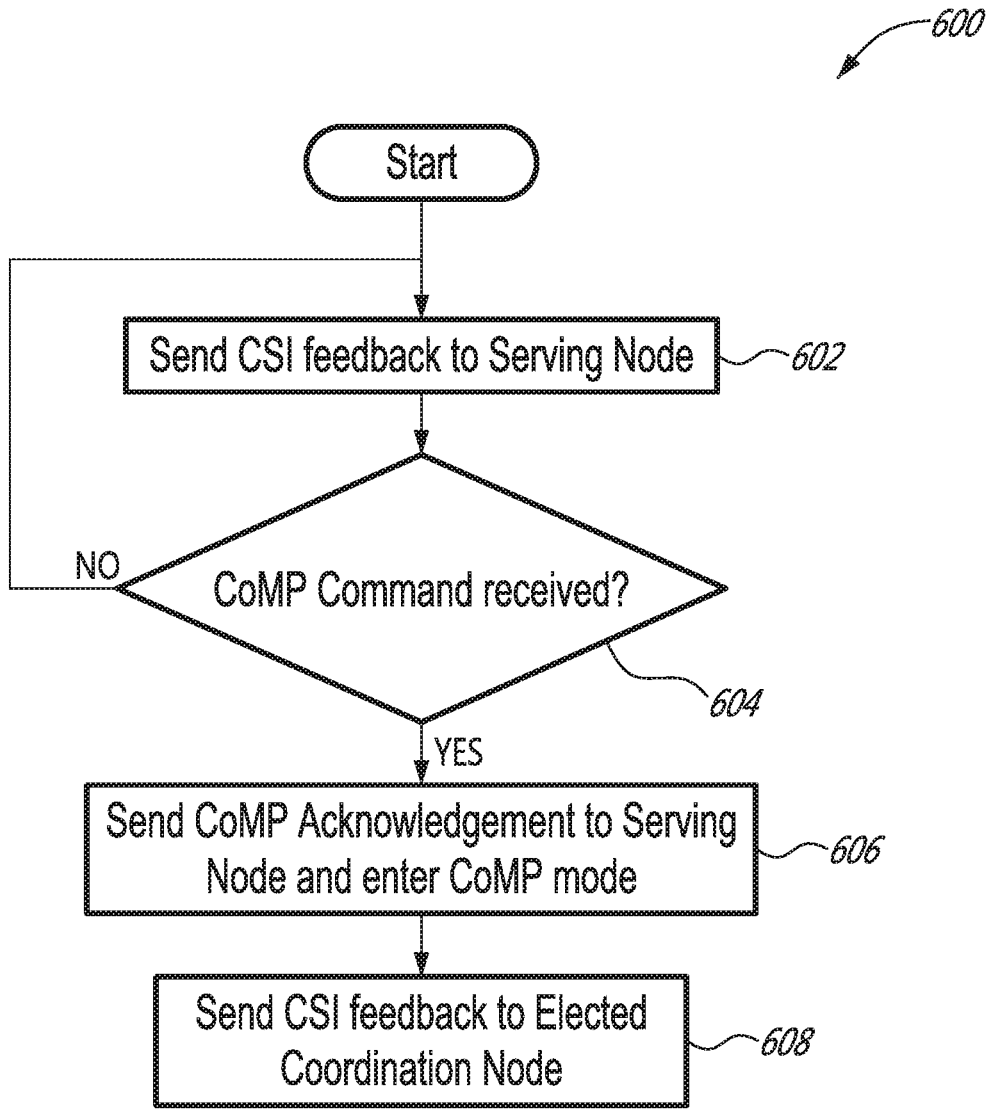
FIG. 7 illustrates an example method for a UE for establishing CoMP communications with the CoMP set of basestations of FIG. 5, in accordance with principles of the present disclosure for electing a coordination node.

FIG. 7 illustrates an example method 600 for a UE (e.g. UE 320 of FIG. 5) for establishing CoMP communications with a CoMP set of basestations in accordance with principles of the present disclosure. The method begins at step 602 where the UE sends CSI feedback to its serving node (e.g. basestation 310 of FIG. 5). The CSI feedback may be in the form of a report which includes a signal quality indication (e.g. signal strength) for the serving node but also for at least one neighbor node. As noted above, the serving node may use the signal quality measurements reported by the UE for both the serving node and at least one neighbor node to determine if a CoMP session should be established. At step 604, if the UE receives a CoMP command (which may occur when the difference in signal quality at the UE is less than a CoMP threshold), the UE switches its configuration and/or enters into a CoMP mode to receive/process (downlink) CoMP data (not shown). Optionally, the UE may also send a CoMP acknowledgement message to the serving node. In some implementations, the CoMP command received includes an indication of the coordination node elected to receive the CSI feedback. After the establishment of a CoMP session, the UE sends its CSI feedback to the elected coordination node based on the example methods discussed above.

Figure 8:
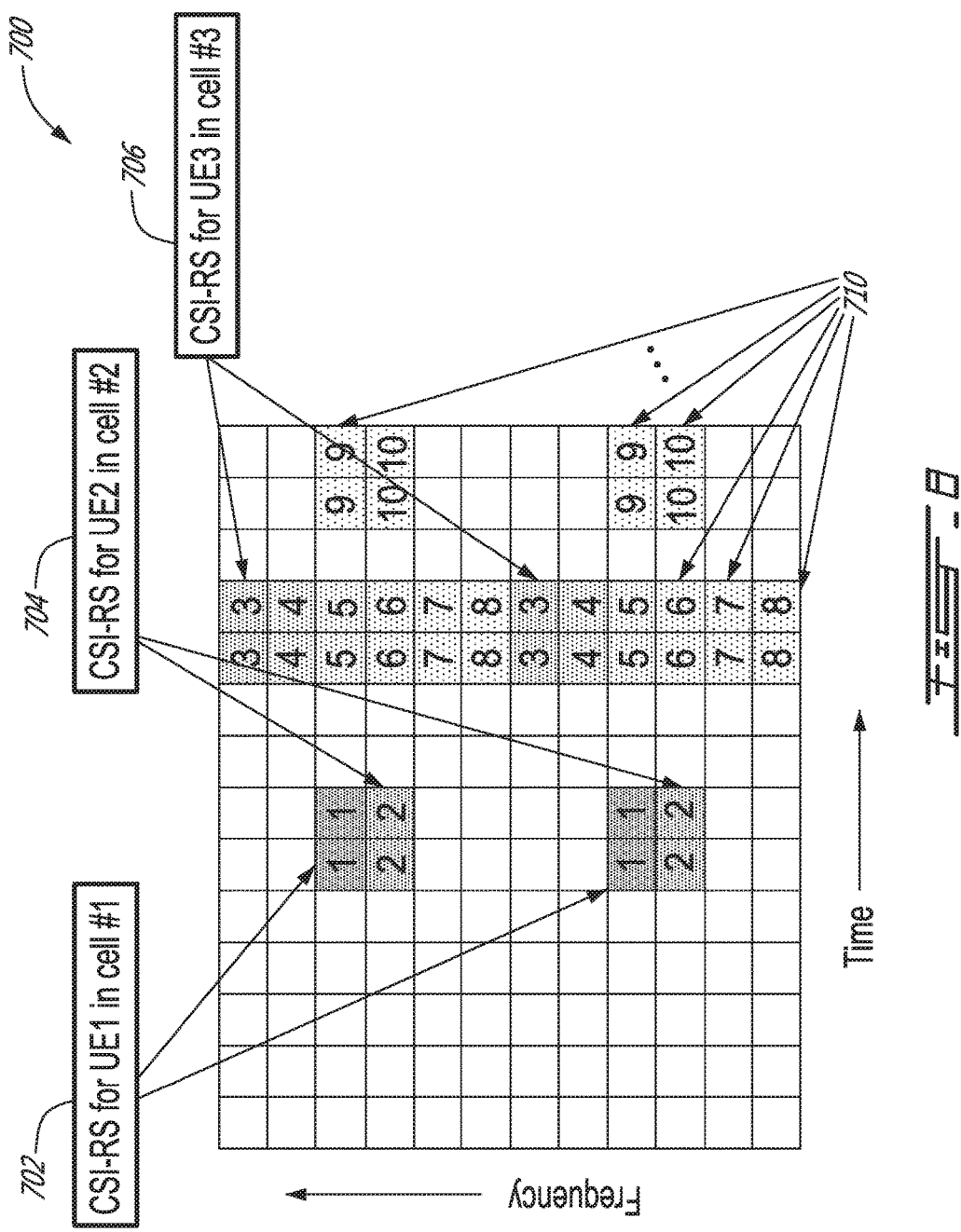
FIG. 8 shows an example of a CSI-RS reference pattern for a basestation elected as a coordination node, according to principles of the present disclosure.

FIG. 8 shows an example of a CSI-RS reference pattern for a basestation elected as a coordination node and in which resources taken from a set of ten pairs of CSI-RS resources 710 normally available for (local) UEs served by the basestation are allocated instead to UEs participating in the CoMP set, including UEs in other cells. In this example, three pairs of CSI-RS resources 702, 704, 706 are configured by the coordination node to collect CSI-RS feedback from participating UEs (e.g. UE1, UE2, UE3) in different cells. With those CSI-RS resources 702, 704, 706, each participating UE (e.g. UE1, UE2, UE3) can report its CSI-RS feedback directly to the coordination node. In some implementations, when an elected coordination node configures resources 702, 704, 706 for collecting CSI-RS feedback from participating UEs, the other (unelected) basestations in the CoMP set do not use or configure the same time/frequency resources for their respective UEs so as to reduce or avoid interference. To enable this, the coordination node could be configured to send an (X2/S1) notification to the other basestations indicating the specific CSI-RS resources configured at the coordination node for UEs participating in the CoMP set. Other implementations for configuring resources for CSI feedback are possible.

FIGS. 9A-B are block diagrams of exemplary embodiments of a basestation node 1000 and a wireless device 1100 (e.g. such as those described in relation to FIGS. 2-8 above) configured for CoMP operation in accordance with the principles of the present disclosure.

As illustrated in FIG. 9A, basestation node 1000 includes a transceiver 1010, one or more processor(s) 1020, memory 1030 which includes an election module 1040, a basestation CoMP module 1050 and a wireless device CoMP module 1060. In one embodiment, the transceiver 1010 may be replaced by a transmitter and a receiver (not shown). The election module 1040 is configured to perform the coordination node election functionality described above in relation to a basestation. The basestation CoMP module 1050 is configured to perform the CoMP set establishment functionality described above in relation to a basestation. The wireless device CoMP module 1060 is configured to perform the UE or wireless device CoMP configuration functionality described above in relation to a basestation node. The election module 1040, the basestation CoMP module 1050 and the wireless device CoMP module 1060 are implemented at least partially in the memory 1030 in the form of software or (computer-implemented) instructions executed by the processor(s) 1020 within the basestation node 1000 or distributed across two or more nodes (e.g., the basestation network node 1000 and another node). In another example, the processor(s) 1020 includes one or more hardware components (e.g., Application Specific Integrated Circuits (ASICs)) that provide some or all of the coordination node election, CoMP set establishment and wireless device CoMP configuration functionality described above. In another embodiment, the processor(s) 1020 include one or more hardware components (e.g., Central Processing Units (CPUs)), and some or all of the coordination node election, CoMP set establishment and wireless device CoMP configuration functionality described above is implemented in software stored in, e.g., the memory 1030 and executed by the processor 1020. In yet another embodiment, the processor(s) 1020 and memory 1030 form processing means (not shown) configured to perform the coordination node election, CoMP set establishment and wireless device CoMP configuration functionality described.

As illustrated in FIG. 9B, wireless device or UE 1100 includes a transceiver 1110, one or more processor(s) 1120, memory 1130 which includes a CoMP module 1140, and a reporting module 1150. In one embodiment, the transceiver 1110 may be replaced by a transmitter and a receiver (not shown). The CoMP module 1140 is configured to perform the CoMP functionality described above in relation to a wireless device which includes receiving a CoMP command to enter into a CoMP state and/or switch to a CoMP mode. The reporting module 1150 is configured to perform the reporting functionality described above in relation to wireless devices (which includes reporting CSI feedback to an elected coordination node in the CoMP set using resources allocated by the elected coordination node). The CoMP module 1140, and the reporting module 1150 are implemented at least partially in the memory 1130 in the form of software or (computer-implemented) instructions executed by the processor(s) 1120 within the wireless device 1100 or distributed across two or more nodes (e.g., the wireless device 1100 and another node). In another example, the processor(s) 1120 includes one or more hardware components (e.g., Application Specific Integrated Circuits (ASICs)) that provide some or all of the CoMP and reporting functionality described above. In another embodiment, the processor(s) 1120 include one or more hardware components (e.g., Central Processing Units (CPUs)), and some or all of the CoMP and reporting functionality described above is implemented in software stored in, e.g., the memory 1030 and executed by the processor 1020. In yet another embodiment, the processor(s) 1120 and memory 1130 form processing means (not shown) configured to perform the CoMP and reporting functionality described above.

FIGS. 10A-B show a variant for each of the basestation node and device examples of FIGS. 9A-B, denoted respectively as basestation node 1200, and wireless device 1300. Each of the basestation node 1200 and wireless device 1300 includes a transceiver 1210, 1310 and circuitry containing (computer-implemented) instructions which when executed by one or more processor(s) 1220, 1320 cause their respective node 1200, 1300 to perform some or all of their respective (basestation node and wireless device) functionality described above. In yet another variant, the circuitry includes the respective memory 1230, 1330 and processor(s) 1220, 1320 which, similarly to the example basestation node 1000 and wireless device 1100 of FIGS. 8A-B may be implemented in many different ways. In one example, the memories 1230, 1330 contain instructions which, when executed, cause the respective nodes 1200, 1300 to perform some or all of their respective (basestation node, wireless device) functionality described above. Other implementations are possible.

Other Embodiments

The following is also noted in accordance with other contemplated embodiments.

In one broad aspect of the present disclosure, there is provided a method for a node for electing a coordination node in a Coordinated Multipoint (CoMP) set of cooperating nodes for receiving channel information from a plurality of wireless devices operating in a wireless network. In one example, the method includes determining a channel quality parameter for the node indicative a channel quality between the node and the wireless devices, receiving a channel quality parameter from at least one neighbor node in the CoMP set indicative of a respective channel quality between the at least one neighbor node and the wireless devices and electing the coordination node as either the node or one of the at least one neighbor node based on the channel quality parameters. In some embodiments, the method includes sending a message to the at least one neighbor node that identifies the coordination node elected.

In another example, the method includes determining a channel quality parameter for the node indicative of a channel quality between the node and the plurality of wireless devices and receiving a first message from a first neighbor node in the CoMP set which contains a channel quality parameter for another node (e.g. a neighbor elected node) in the CoMP set indicative of a channel quality between the other node (e.g. the neighbor elected node) and the plurality of wireless devices. The method also includes sending a second message to the first neighbor node in the CoMP set where the second message identifies the coordination node elected by the node based on the channel quality parameters for the node and the other node (e.g. the neighbor elected node). The neighbor elected node is either the first neighbor node itself or another node in the CoMP set.

In some other embodiments, the second message identifies the node elected as the coordination node if the channel quality parameter for the node is greater than the channel quality parameter for the neighbor elected node. In other embodiments, the second message identifies the neighbor elected node as the coordination node if the channel quality parameter for the neighbor elected node is greater than the channel quality parameter for the node.

In yet other embodiments, the neighbor elected node is elected by the first neighbor node as one of the first neighbor node and a second neighbor node in the CoMP set based on a channel quality parameter for each of the first and second neighbor nodes. In yet other embodiments, the neighbor elected node is a first neighbor elected node and the method further includes receiving another first message from a second neighbor node in the CoMP set where the other first message includes a channel quality parameter for a second neighbor elected node, and where the second message identifies the coordination node elected by the node based on the channel quality parameters for the node, the first neighbor elected node and the second neighbor elected node.

In yet other embodiments, the steps of receiving and sending are repeated until the elected coordination node identified in the second message is the same as the first neighbor elected node identified in the first message. In yet other embodiments, each of the cooperating nodes in the CoMP set is configured to serve a subset of the plurality of wireless devices in a respective cell of the wireless network.

In yet other embodiments, during a CoMP session, the elected coordination node in the CoMP set is configured to receive channel information from each of the plurality of wireless devices. In yet other embodiments, the channel information includes Channel State Information (CSI), the channel quality parameter for the node and for the other node is based on CSI received from the plurality of wireless devices prior to the CoMP session and/or during the CoMP session, the elected coordination node in the CoMP set is configured to allocate radio resources to each of the wireless devices for receiving the channel information.

In yet other embodiments, the first message is a CoMP grant message received from the first neighbor node in response to a CoMP request message sent by the node. In yet other embodiments, the second message is a CoMP notification message.

In another broad aspect of the present disclosure, there is provided a node for electing a coordination node in a CoMP set of cooperating nodes for receiving channel information from a plurality of wireless devices operating in a wireless network, where the node includes circuitry containing instructions which, when executed, cause the node to perform any of the steps and/or method embodiments described above.

In yet another broad aspect of the present disclosure there is provided a non-transitory computer readable memory configured to store executable instructions for a node, the executable instructions when executed by a processor cause the node to perform any of the steps and/or method embodiments described above.

In another broad aspect of the present disclosure, there is provided a node for electing a coordination node in a CoMP set of cooperating nodes for receiving channel information from a plurality of wireless devices operating in a wireless network. The node includes an election module for electing the coordination node.

In one example, the election module is for determining a channel quality parameter for the node indicative a channel quality between the node and the wireless devices, receiving a channel quality parameter from at least one neighbor node in the CoMP set indicative of a respective channel quality between the at least one neighbor node and the wireless devices and electing the coordination node as either the node or one of the at least one neighbor node based on the channel quality parameters. In some embodiments, the election module is also for sending a message to the at least one neighbor node that identifies the coordination node elected.

In another example, the election module is for determining a channel quality parameter for the node indicative of a channel quality between the node and the plurality of wireless devices and receiving a first message from a first neighbor node in the CoMP set which contains a channel quality parameter for another node (e.g. a neighbor elected node) in the CoMP set indicative of a channel quality between the other node (e.g. the neighbor elected node) and the plurality of wireless devices. The election module is also for sending a second message to the first neighbor node in the CoMP set where the second message identifies the coordination node elected by the node based on the channel quality parameters for the node and the other node (e.g. the neighbor elected node). The neighbor elected node is either the first neighbor node itself or another node in the CoMP set.

In some embodiments, the node also includes a basestation CoMP module for establishing a CoMP set for a wireless device and a wireless device CoMP module for establishing a CoMP configuration for the wireless device. In other embodiments, the wireless device CoMP module is for sending a CoMP command to the wireless device and/or receiving a CoMP acknowledgement from the wireless device.

It will be appreciated by persons skilled in the art that the present disclosure is not limited to what has been particularly shown and described herein above. Modifications and variations are possible in light of the above teachings without departing from the invention as embodied in the following claims.

The invention claimed is:

1. A method for a node for electing a coordination node in a Coordinated Multipoint (CoMP) set of cooperating nodes for receiving channel information from a plurality of wireless devices operating in a wireless network, the method comprising:

determining a channel quality parameter for the node indicative of a channel quality between the node and the plurality of wireless devices;

receiving a first message from a first neighbor node in the CoMP set, the first message including a channel quality parameter for a third node in the CoMP set indicative of a channel quality between the third node and the plurality of wireless devices, wherein the third node comprises one of the first neighbor node and a member node of the CoMP set other than the node and the first neighbor node; and sending a second message to the first neighbor node in the CoMP set, the second message identifying the coordination node elected by the node based on the channel quality parameters for the node and the third node.

2. The method of claim 1 wherein the second message identifies the node elected as the coordination node if the channel quality parameter for the node is greater than the channel quality parameter for the third node in the CoMP set.

3. The method of claim 1 wherein the second message identifies the third node elected as the coordination node if the channel quality parameter for the third node is greater than the channel quality parameter for the node.

4. The method of claim 1 wherein the first message identifies the third node as a node elected by the first neighbor node.

5. The method of claim 4 wherein the first neighbor elected node is elected by the first neighbor node as one of the first neighbor node and a second neighbor node in the CoMP set based on a channel quality parameter for each of the first and second neighbor nodes.

6. The method of claim 4 further comprising receiving another first message from a second neighbor node in the CoMP set, the other first message including a channel quality parameter for a second neighbor elected node, and wherein the second message identifies the coordination node elected by the node based on the channel quality parameters for the node, the first neighbor elected node and the second neighbor elected node.

7. The method of claim 1 wherein the steps of receiving and sending are repeated until the elected coordination node identified in the second message is the same as the first neighbor elected node identified in the first message.

8. The method of claim 1 wherein during a CoMP session, the elected coordination node in the CoMP set is configured to receive channel information from each of the plurality of wireless devices.

9. The method of claim 8 wherein the channel information comprises Channel State Information (CSI).

10. The method of claim 8 wherein the channel quality parameter for the node and for the third node is based on CSI received from the plurality of wireless devices prior to the CoMP session.

11. The method of claim 8 wherein, during the CoMP session, the elected coordination node in the CoMP set is configured to allocate radio resources to each of the wireless devices for receiving the channel information.

12. The method of claim 1 wherein the first message is a CoMP grant message received from the first neighbor node in response to a CoMP request message sent by the node.

13. The method of claim 1 wherein the second message is a CoMP notification message.

14. A node configured for electing a coordination node in a Coordinated Multipoint (CoMP) set of cooperating nodes for receiving channel information from a plurality of wireless devices operating in a wireless network, the node comprising circuitry configured to:
   determine a channel quality parameter for the node indicative of a channel quality between the node and the plurality of wireless devices;
   receive a first message from a first neighbor node in the CoMP set, the first message including a channel quality parameter for a third node in the CoMP set indicative of a channel quality between the third node and the plurality of wireless devices, wherein the third node comprises one of the first neighbor node and a member node of the CoMP set other than the node and the first neighbor node; and
   send a second message to the first neighbor node in the CoMP set, the second message identifying the coordination node elected by the node based on the channel quality parameters for the node and the third node.

15. The node of claim 14 wherein the second message identifies the node elected as the coordination node if the channel quality parameter for the node is greater than the channel quality parameter for the third node in the CoMP set.

16. The node of claim 14 wherein the second message identifies the third node elected as the coordination node if the channel quality parameter for the third node is greater than the channel quality parameter for the node.

17. The node of claim 14 wherein the first message identifies the third node as a node elected by the first neighbor node.

18. The node of claim 17 wherein the first neighbor elected node is elected by the first neighbor node as one of the first neighbor node and a second neighbor node in the CoMP set based on a channel quality parameter for each of the first and second neighbor nodes.

19. The node of claim 17 wherein the instructions are further configured to cause the node to receive another first message from a second neighbor node in the CoMP set, the other first message including a channel quality parameter for a second neighbor elected node, and wherein the second message identifies the coordination node elected by the node based on the channel quality parameters for the node, the first neighbor elected node and the second neighbor elected node.

20. The node of claim 14 wherein the instructions are further configured to cause the node to repeat receiving and sending until the elected coordination node identified in the second message is the same as the first neighbor elected node identified in the first message.

21. The node of claim 14 wherein each of the cooperating nodes in the CoMP set is configured to serve a subset of the plurality of wireless devices in a respective cell of the wireless network.

22. The node of claim 14 wherein during a CoMP session, the elected coordination node in the CoMP set is configured to receive channel information from each of the plurality of wireless devices.

23. The node of claim 22 wherein the channel information comprises CSI.

24. The node of claim 22 wherein the channel quality parameter for the node and for the third node is based on CSI received from the plurality of wireless devices prior to the CoMP session.

25. The node of claim 22 wherein, during the CoMP session, the elected coordination node in the CoMP set is configured to allocate radio resources to each of the wireless devices for receiving the channel information.

26. The node of claim 14 wherein the first message is a CoMP grant message received from the first neighbor node in response to a CoMP request message sent by the node.

27. The node of claim 14 wherein the second message is a CoMP notification message.

28. A non-transitory computer readable memory configured to store executable instructions for a node for electing a coordination node in a Coordinated Multipoint (CoMP) set of cooperating nodes for receiving channel information from a plurality of wireless devices operating in a wireless network, the executable instructions when executed by a processor cause the node to:
   determine a channel quality parameter for the node indicative of a channel quality between the node and the plurality of wireless devices;
   receive a first message from a first neighbor node in the CoMP set, the first message including a channel quality parameter for a third node in the CoMP set indicative of a channel quality between the third node and the plurality of wireless devices wherein the third node comprises one of the first neighbor node and a member node of the CoMP set other than the node and the first neighbor node; and send a second message to the first neighbor node in the CoMP set, the second message identifying the coordination node elected by the node based on the channel quality parameters for the node and the third node.

29. The method of claim 1 wherein each of the cooperating nodes in the CoMP set is configured to serve a subset of the plurality of wireless devices in a respective cell of the wireless network.

* * * * *